United States Patent
Dodiuk-Kenig et al.

(10) Patent No.: US 12,043,757 B2
(45) Date of Patent: Jul. 23, 2024

(54) DURABLE SUPERHYDROPHOBIC COATING

(71) Applicant: AZRA SHS TECH INC., New York, NY (US)

(72) Inventors: Hanna Dodiuk-Kenig, Haifa (IL); Ana Dotan, Ramat-Gan (IL); Niv Cohen, Ness Ziona (IL); Shmuel Kenig, Ramat-Gan (IL)

(73) Assignee: AZRA SHS TECH INC., New York, NY (US)

( * ) Notice: Subject to any disclaimer, the term of this patent is extended or adjusted under 35 U.S.C. 154(b) by 0 days.

(21) Appl. No.: 16/999,630

(22) Filed: Aug. 21, 2020

(65) Prior Publication Data

US 2020/0385586 A1 Dec. 10, 2020

Related U.S. Application Data

(63) Continuation of application No. PCT/IB2018/051090, filed on Feb. 22, 2018.

(51) Int. Cl.
| | |
|---|---|
| *C09D 5/00* | (2006.01) |
| *B05D 3/06* | (2006.01) |
| *B05D 5/08* | (2006.01) |
| *C09D 7/40* | (2018.01) |
| *C09D 7/61* | (2018.01) |
| *C09D 183/04* | (2006.01) |
| *C08G 77/20* | (2006.01) |
| *C08K 3/14* | (2006.01) |
| *C08K 3/22* | (2006.01) |
| *C08K 3/36* | (2006.01) |
| *C08K 3/38* | (2006.01) |
| *C08K 3/40* | (2006.01) |
| *C08K 9/04* | (2006.01) |

(52) U.S. Cl.
CPC .......... *C09D 5/00* (2013.01); *B05D 3/06* (2013.01); *B05D 5/08* (2013.01); *C09D 7/61* (2018.01); *C09D 7/67* (2018.01); *C09D 183/04* (2013.01); *C08G 77/20* (2013.01); *C08K 3/14* (2013.01); *C08K 3/22* (2013.01); *C08K 2003/2241* (2013.01); *C08K 3/36* (2013.01); *C08K 2003/385* (2013.01); *C08K 3/40* (2013.01); *C08K 9/04* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 2003/0021566 A1* | 1/2003 | Shustack | B82Y 30/00 385/129 |
| 2003/0068486 A1* | 4/2003 | Arney | C03C 17/007 428/323 |
| 2006/0008618 A1 | 1/2006 | Wang et al. | |
| 2007/0141114 A1 | 6/2007 | Muisener et al. | |
| 2010/0314575 A1 | 12/2010 | Gao et al. | |
| 2012/0264113 A1 | 10/2012 | Garcia et al. | |

FOREIGN PATENT DOCUMENTS

WO 2017/111702 A1 6/2017

OTHER PUBLICATIONS

International Search Report and written opinion issued for corresponding International Patent Application No. PCT/IB2018/051090, dated Jun. 25, 2018.

* cited by examiner

*Primary Examiner* — Sheeba Ahmed
(74) *Attorney, Agent, or Firm* — Myers Wolin, LLC

(57) ABSTRACT

A superhydrophobic coating composition is provided comprising an NP component and a radical initiator (RI), wherein the NP component comprises NP particles having organic moieties bound to the surface of the NP particles. Also provided is a superhydrophobic coating composition further comprising a fluid. Also provided is a method for preparing a super-hydrophobic (SH) surface, where the method includes mixing an NP component with at least one RI and possibly with a fluid, thereby providing a coating composition, applying the coating composition onto a substrate (pre-coated or containing oxides) thereby providing a coated substrate; and applying radiation to the coated substrate, thereby providing the SH surface on which at least part of the NP component is covalently bound, directly or indirectly, to the substrate.

7 Claims, 6 Drawing Sheets

DURABLE SUPERHYDROPHOBIC COATING

CROSS REFERENCE TO RELATED APPLICATION

This application is a continuation of International Application No. PCT/IB2018/051090, filed Feb. 22, 2018, the contents of which are hereby incorporated by reference in their entirety.

FIELD OF THE INVENTION

The present invention is directed to a durable transparent and non-transparent coating. Particularly, the invention is directed to durable superhydrophobic coatings, based on radical chemistry of surface treated nanoparticles, wherein nanoparticles are covalently bound to any type of surface by way of radical induced covalent bonding.

BACKGROUND OF THE INVENTION

Superhydrophobic (SH) surfaces can be obtained by tailoring both chemistry and topography, mimicking, for example, the *Lotus* leaf. SH, surface coatings have many commercial and industrial applications due to their unique features including self-cleaning effect, anticorrosion, ice adhesion reduction, ice-repellency, and low hydrodynamic friction. SH surfaces may also be used as templates for directed self assembly of nanomaterials, as well as micro-electromechanical systems. The applications of such surfaces are related to automotive, building, agriculture, optical, military, and aerospace systems.

The durability of SH coatings is a crucial issue for commercial applications. However, as known today, most of the SH coatings possess limited abrasion resistance. Abrasion resistance is determined by evaluating the change in the surface static contact angle (CA) and sliding angle (SA) and is an extremely important factor in coatings since, when low, the coatings tend to peel off from the article that they are coating.

A variety of methodologies have been used to produce SH surfaces over the past decade. One type of methods is a bottom-up additive approach, including techniques such as molecular self-assembly, vapor phase deposition, sol-gel nanofabrication, carbon nanotubes in thermoplastics, embedded nanoparticles (NPs) of silica in thermoset matrixes, and cast silica/POSS in fluoroalkylsilane. Other known methods use a top-down subtractive approach, including methods such as those based on plasma etching, soft lithography, nanoimprint lithography, optical lithography, e-beam lithography, block copolymer lithography, scanning probe lithography, and slippery liquid-infused porous surfaces (SLIPS).

All of the above mentioned methodologies are based on nano/micrometer features to create the roughness and low surface energy chemistry; however, they result in coatings having poor mechanical durability and stability, especially under harsh environmental conditions.

Generally, the interaction between the coated substrate and the nanostructure of the coating affects the stability of the coated structure. If the interaction is weak, the nanostructured coating may be removed under abrasion, reducing superhydrophobicity and resulting in poor mechanical properties of the coating. Therefore, it would be highly desirable to provide a rough SH coating, in which the interfacial interaction between the coated substrates and the nanostructure of the coating is strong, thereby providing a durable SH coating.

SUMMARY OF THE INVENTION

Embodiments of the invention are directed to a coating composition comprising a nanoparticle (NP) component, and at least one radical initiator (RI), wherein the NP component comprises NP particles having organic moieties bound to the surface of the NP particles.

According to some embodiments, the composition further comprises a fluid. According to some embodiments, the nanoparticle component comprises silica ($SiO_2$) NPs, glass NPs, Titania NPs, silicate NPs, nitride NPs, carbide NPs, or any combination thereof.

According to some embodiments, the RI is a radical photo initiator (RPI), a radical heat initiator (RHI) or any combination thereof.

Some embodiments of the invention are directed to a dual layer coating composition comprising a first layer and a second layer, wherein the first layer comprises a primer and wherein the second layer comprises a nanoparticle (NP) component, and at least one (RI), wherein the NP component comprises NP particles having organic moieties bound to the surface of the NP particles.

According to some embodiments, the RHI is a peroxide. According to some embodiments, the primer is an organic primer. According to some embodiments, the fluid is an alcohol, an organic solvent, water, or any combination thereof.

Embodiments of the invention are directed to a method for preparing a super-hydrophobic (SH) surface, wherein the method comprises:
- mixing an NP component with at least one RI, thereby providing a coating composition;
- applying the coating composition onto a substrate, thereby providing a coated substrate; and
- applying radiation to the coated substrate, thereby providing the SH surface on which at least part of the NP component is covalently bound, directly or indirectly, to the substrate.

According to some embodiments, a primer is pre-coated onto the substrate and solidified thereon, thereby providing a pre-coated substrate, prior to applying the coating composition onto the substrate, such that the coating composition is applied onto the pre-coated substrate and is thereafter covalently bound to the primer, thereby being indirectly bound to the substrate.

According to some embodiments, the NP component and the RI are further mixed with a fluid, thereby providing a coating composition that comprises an NP component, at least one RI and a fluid.

Embodiments of the invention are directed to an SH surface comprising an NP component covalently bound, directly or indirectly, to a substrate. According to some embodiments, the NP component is covalently bound to a primer that is adhered to the substrate, thereby providing an SH surface in which the NP component is adhered indirectly to the substrate. According to some embodiments, the substrate comprises oxide moieties and wherein the NP component is covalently bound, directly to the oxide moieties on the substrate, following radical chemistry Embodiments of the invention are directed to an ice and/or water repellant article comprising an SH surface, wherein the SH surface comprises an NP component covalently bound, directly or indirectly, to a substrate. Embodiments of the invention are directed to a self-cleaning article comprising an SH surface, wherein the SH surface comprises an NP component covalently bound, directly or indirectly, to a substrate. Embodiments of the invention are directed to a reduced air and water friction article comprising an SH surface, wherein the SH surface comprises an NP component covalently bound, directly or indirectly, to a substrate.

Further embodiments of the invention are directed to a kit comprising:
- an NP component;
- at least one RI; and
- an instruction leaflet including instructions for preparing an SH surface.

According to some embodiments, the kit further comprises a primer. According to some embodiments, the kit further comprises a substrate. According to some embodiments, the RI is an RPI, an RHI or any combination thereof. According to some embodiments, the RHI is a peroxide. According to some embodiments, the kit further comprises a fluid.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals, indicate corresponding, analogous or similar elements, and in which:

FIG. 2A) 5 µL water droplets rolled off the SH surface, FIG. 2B) Measurement of CA of 157°, FIG. 2C) Measurement of 30 µL water droplets SA (<10°);

FIG. 3A) Substrate effect on SH durability, FIG. 3B) Effect of initiators type and concentration on SH coating durability (relative to the $SiO_2$ wt % component of the coatings), FIG. 3C) Durability of SH coating based on five different thermosets as the first layer pre-coated onto the substrate:

FIG. 5A) Durable SH treated PC following Taber abrasion ASTM D-1044 test; and FIG. 5B) Outdoor durability (in hours of exposure to QUV) for SH treated PC samples via dip coating compared to spray coating.

Figure 1:
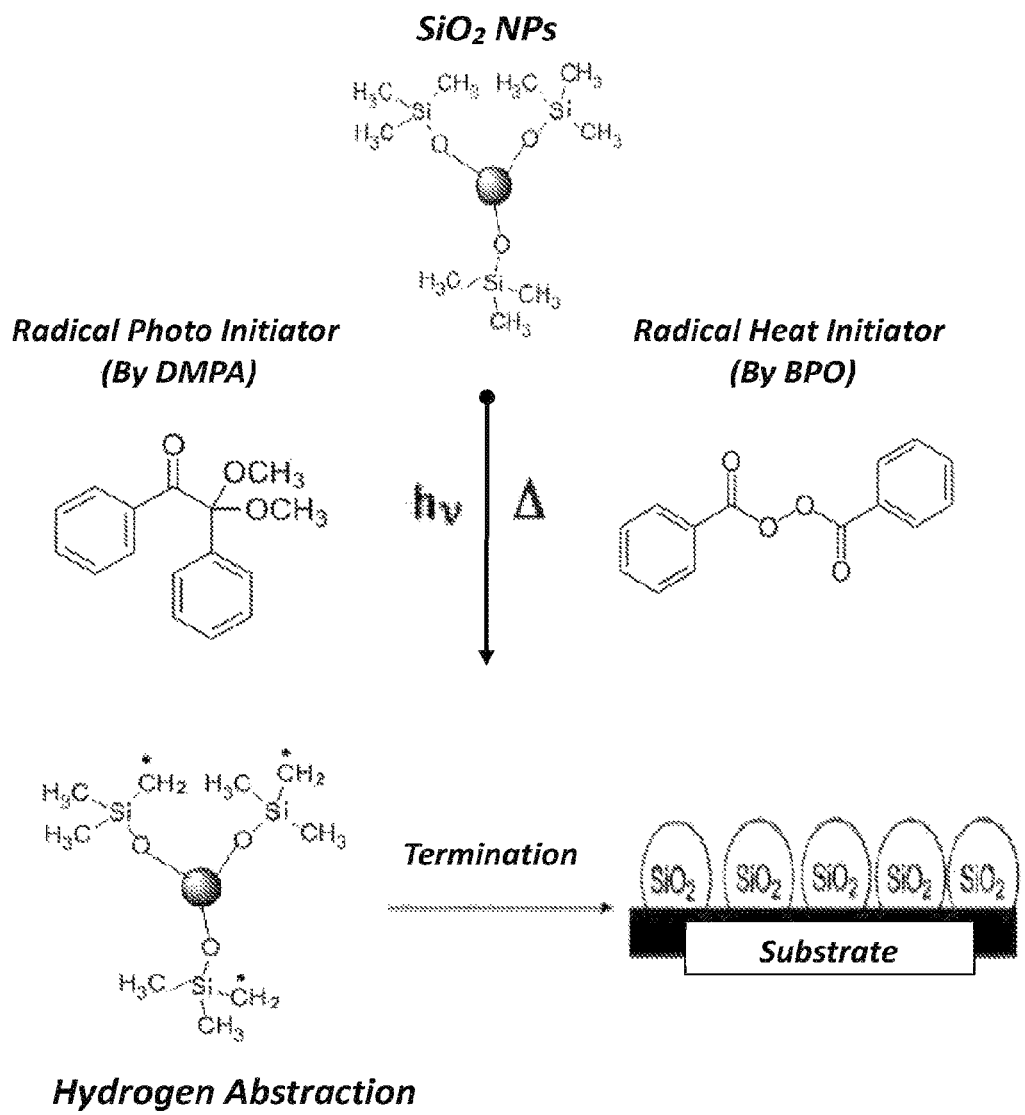
FIG. 1 presents a scheme of an embodiment of the invention in which a coating comprises treated $SiO_2$, BPO and DMPF.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

The term "about" is defined herein to include ±10% of the disclosed value.

It is noted that throughout, unless specifically mentioned otherwise, or unless it would have been understood otherwise by a person skilled in the art, at least a portion of the nanoparticles (NPs) utilized according to this invention are surface treated nanoparticles.

Embodiments of the invention are directed to a coating composition comprising a nanoparticle (NP) component and a radical initiator, wherein the radical initiator (RI) may be activated by any origin of radiation, which may create radicals for forming covalent bonding between the NPs and the substrate on which the coating composition is coated.

The RI may be any type of compound that is capable of forming radicals in order to initiate radical covalent bonding between the NPs and the substrate. For example the RI may be a radical photo initiator (RPI), which may be activated to form radicals by any appropriate wave length of radiation. The radiation wave length used in order to activate the RPI may depend on the type of RPI used. For example, UV, visible light, and laser radiation may be used, depending on the type of RPI as well as other conditions of the system, e.g., the temperature of the substrate.

According to some embodiments, the RI may be a radical heat initiator (RHI), which may be activated to form radicals by any appropriate heat energy, including, heat, microwaves, etc. The type of heat used, e.g., the temperature thereof, maybe dependent on the type of RHI in the composition, as well as on other conditions of the system, e.g., the temperature of the substrate.

According to some embodiments, the RI may be a combination between any number of RIs, including different types of RIs, such as a combination between any number of RPIs and any number of RHIs.

As detailed throughout this application, the coating composition may be coated onto any type of substrate, including metal, glass, polymers, etc. According to some embodiments, the substrate is pre-coated by a primer (first layer), which is coated onto the substrate and solidified thereon prior to the application of the coating composition onto the substrate. In such an embodiment, the covalent bonds are formed between the NPs and the primer.

According to some embodiments, the NP component comprises silica ($SiO_2$) NPs, glass NPs, Titania NPs, silicate NPs, nitride NPs, carbide NPs, or any combination thereof. According to some embodiments, the NPs have organic moieties bound to their surface. According to some embodiments, the organic moieties are alkyl chains, aromatic moieties or any organic group that may be activated to radical moieties. According to some embodiments, the organic moieties are substituted with halogens, e.g., fluorine. Thus, according to some embodiments, the organic moieties include only carbon and hydrogen atoms. According to other embodiments, the organic moieties include carbon, hydrogen and halogens, e.g., fluorine. According, to some embodiments, the organic moieties may be selected from any type of thermoplastic and/or thermoset polymers, any type of silanes, any type of carbon fibers, carbon nanotubes and the like, as well as any organic moiety that may form radicals when treated according to the invention, as detailed herein.

According to some embodiments, the size of the NP is between about 0.3 nm and 100 nm up to 100 μm. According to some embodiments, the size of the NP is between about 0.3 nm and 10 nm. According to some embodiments, the size of the NP is between about 10 nm and 20 nm. According to some embodiments, the size of the NP is between about 20 nm and 30 nm. According to some embodiments, the size of the NP is between about 30 nm and 40 nm. According to some embodiments, the size of the NP is between about 40 nm and 50 nm. According to some embodiments, the size of the NP is between about 50 nm and 60 nm. According to some embodiments, the size of the NP is between about 60 nm and 70 nm. According to some embodiments, the size of the NP is between about 70 nm and 80 nm. According to some embodiments, the size of the NP is between about 80 nm, and 90 nm. According to some embodiments, the size of the NP is between about 90 nm and 100 nm. According to some embodiments, the size of the NP is between about 100 nm and 100 μm.

According to some embodiments, the RHI is a peroxide, which is decomposed by heat. It is noted that each type of peroxide decomposes at a different temperature and therefore, the heat applied will be different depending on the peroxide used. Certain peroxides, such as hydrogen peroxide, decompose and form radicals at room temperature. Thus, when utilizing such peroxides, the application of additional external heat may not be necessary. This is true for peroxides as well as for any other type of RHI possibly used.

According to some embodiments, the composition further comprises a fluid for evenly dispersing and distributing the materials in the composition (e.g., NP, RI). The fluid may be have a low temperature volatility, i.e., lower than about 150° C., lower than about 100° C., lower than about 50° C. or lower than about 25° C. According to some embodiments, the fluid is an alcohol, an organic solvent, water, or any combination thereof.

According to some embodiments, the amount of the fluid in the composition is between about 20% to 99% w/w of the composition. According to some embodiments, the amount of the fluid in the composition is between about 20% to 30% w/w of the composition. According to some embodiments, the amount of the fluid in the composition is between about 30% to 40% w/w of the composition. According to some embodiments, the amount of the fluid in the composition is between about 40% to 50% w/w of the composition. According to some embodiments, the amount of the fluid in the composition is between about 50% to 60% w/w of the composition. According to some embodiments, the amount of the fluid in the composition is between about 60% to 70% w/w of the composition. According to some embodiments, the amount of the fluid in the composition is between about 70% to 80% w/w of the composition. According to some embodiments, the amount of the fluid in the composition is between about 80% to 90% w/w of the composition. According to some embodiments, the amount of the fluid in the composition is between about 90% to 99% w/w of the composition. According to some embodiments, the fluid is removed from the composition by evaporation, vacuum, heat, or any combination thereof.

According to some embodiments, the RPI is selected 2,2-Dimethoxy-2-phenylacetophenone (DMPA), Hydroxy-acetophenonone (HAP), Phosphineoxide (TPO) or any combination thereof.

According to some embodiments, the RHI is a peroxide. According to some embodiments, the RHI is selected from benzoyl peroxide (BPO), tert-Butyl peroxybenzoate, tert-Butyl peroxy-2-ethylhexanoate, perketals such as 1,1-Di (tert-butylperoxy)cyclohexane, or any combination thereof.

According to some embodiments, the primer is selected from room temperature vulcanizing (RTV) silicone, silicone acrylate, urethane acrylate, polyurethane, epoxy, polyester, silanes or any mixture thereof. It is noted that, in this document, the primers may also be referred to as binders.

Further embodiments of the invention are directed to a method for preparing a super-hydrophobic (SH) surface, the method comprising
   mixing an NP component with at least one RI, thereby providing a coating composition;
   applying the coating composition onto a substrate thereby providing a coated substrate; and
   activating the RI by any type of radiation, thereby providing the SH surface.

According to some embodiments, a primer (first layer) is pre-coated onto the substrate and solidified thereon, thereby providing a pre-coated substrate, prior to applying the coating composition onto the substrate, such that the coating composition is applied to a pre-coated substrate, pre-coated with a primer. This may be particularly useful if the substrate surface is not readily susceptible to radical chemistry.

According to some embodiments, the coating composition, primer, or both, may be applied to the substrate by spraying, brushing, dipping or any other appropriate coating method.

Embodiments of the invention are directed to an SH surface comprising an NP component covalently bound, directly or indirectly, to a substrate. According to some embodiments, due to the radiation applied, the NPs are directly bound to the substrate via the organic moieties found on the surface of the NPs. According to some embodiments, due to the radiation applied, the NP component is covalently bound, via the organic moieties, to the primer, which is adhered to the substrate, thereby providing an SH surface in which the NP component is adhered indirectly to the substrate. It is noted that throughout this application, unless specifically mentioned otherwise, or unless would have been understood otherwise by a person skilled in the art, the term "radiation" used herein is meant to encompass any appropriate types of radiation, including heat radiation, photo radiation, etc.

According to some embodiments, the SH surface of the invention is transparent. According to other embodiments, the SH surface of the invention is non-transparent. In this respect it is noted that any appropriate type of material, such as any appropriate pigmentation may be added to the substrate or to any of the coatings in order to control the transparency/non-transparency of the SH surface of the invention.

According to some embodiments, the substrate is a metallic substrate, e.g., an aluminum substrate, steel, titanium, or any other metal that can be oxidized to form a metal oxide. According to some embodiments, the substrate is a ceramic substrate, such as glass, silica, or alumina. According to some embodiments, the substrate is a polymeric substrate, e.g., polycarbonate, polypropylene, Nylon, ABS (acrylonitrile butadiene styrene). According to some embodiments, the substrate is a glass substrate. According to some embodiments, the substrate is an organic substrate, including polymers, and the like.

According to some embodiments, the substrate may, under treatment, form radicals or be susceptible to radical chemistry on the surface of the substrate, thereby allowing the NP component to be covalently bound thereto, as detailed herein. For example, the substrate may include oxygen moieties on its surface. For example, the aluminum substrate may comprise $Al_2O_3$ on its surface. For example, a steel substrate may include $Fe_2O_3$ moieties on its surface.

According to some embodiments, the substrate is a coated substrate, including at least two layers, wherein the first layer is a glass, ceramic, organic, polymer, metal or metal alloy and the second layer is a primer layer, coated on the first layer. According to some embodiments, the primer layer is an organic layer, e.g., an epoxy, polyurethane, silicone, silicone acrylate, urethane acrylate, polyester. When the substrate is a coated substrate the mixture is applied to the coating of the substrate and therefore, the NPs are covalently bound to the coating on the substrate, i.e., to the uppermost, exposed layer on the substrate.

According to some embodiments, the substrate may be pre-coated with any number of layers, wherein the coating composition of the invention is coated on top of those layers. Further, according to some embodiments, any number of layers of the coating composition of the invention may be coated onto the substrate. According to some embodiments, each layer is covalently bound to the layer(s) it is adjacent to.

According to some embodiments, the photo radiation is performed using radiation between about 200 to 10,000 nm. According to some embodiments, the photo radiation is performed using UV radiation between about 200 to 300 nm. According to some embodiments, the photo radiation is performed using UV radiation between about 300 to 400 nm.

According to some embodiments, the photo radiation is performed using visible radiation between about 400 to 500 nm. According to some embodiments, the photo radiation is performed using visible radiation between about 500 to 600 nm. According to some embodiments, the photo radiation is performed using visible radiation between about 600 to700 nm. According to some embodiments, the photo radiation is performed using visible radiation between about 700 to 800 nm. According to some embodiments, the photo radiation is performed using visible radiation between about 800 to 900 nm. According to some embodiments, the photo radiation is performed using visible radiation between about 900 to 1000 nm.

According to some embodiments, the photo radiation is performed using radiation between about 1000 to 2000 nm. According to some embodiments, the photo radiation is performed using radiation between about 2000 to 3000 nm. According to some embodiments, the photo radiation is performed using radiation between about 3000 to 4000 nm. According to some embodiments, the photo radiation is performed using radiation between about 4000 to 5000 nm. According to some embodiments, the photo radiation is performed using radiation between about 5000 to 6000 nm. According to some embodiments, the photo radiation is performed using radiation between about 6000 to 7000 nm. According to some embodiments, the photo radiation is performed using radiation between about 7000 to 8000 nm. According to some embodiments, the photo radiation is performed using radiation between about 8000 to 9000 nm. According to some embodiments, the photo radiation is performed using radiation between about 9000 to 10,000 nm.

According to some embodiments, the radiation is performed for about 1-600 seconds. According to some embodiments, the radiation is performed for about 1-50 seconds. According to some embodiments, the radiation is performed for about 50-100 seconds. According to some embodiments, the radiation is performed for about 100-200 seconds. According to some embodiments, the radiation is performed for about 200-300 seconds. According to some embodiments, the radiation is performed for about 300-400 seconds. According to some embodiments, the radiation is performed for about 400-500 seconds. According to some embodiments, the radiation is performed for about 500-600 seconds.

According to some embodiments, the heat radiation is performed by heating to between about 40° C. to 200° C. According to some embodiments, the heat radiation is performed by heating to between about 40° C. to 60° C. According to some embodiments, the heat radiation is performed by heating to between about 60° C. to 80° C. According to some embodiments, the heat radiation is performed by heating to between about 80° C. to 100° C. According to some embodiments, the heat radiation is performed by heating to between about 100° C. to 120° C. According to some embodiments, the heat radiation is performed by heating to between about 120° C. to 140° C. According to some embodiments, the heat radiation is performed by heating to between about 140° C. to 160° C. According to some embodiments, the heat radiation is performed by heating to between about 160° C. to 180° C. According to some embodiments, the heat radiation is performed by heating to between about 180° C. to 200° C.

According to some embodiments, the heat radiation is performed by heating for between 1 to 600 seconds. According to some embodiments, the heat radiation is performed by heating for between 1 to 50 seconds. According to some embodiments, the heat radiation is performed by heating for between 50 to 100 seconds. According to some embodiments, the heat radiation is performed by heating for between 100 to 150 seconds. According to some embodiments, the heat radiation is performed by heating for between 150 to 200 seconds. According to some embodiments, the heat radiation is performed by heating for between 200 to 250 seconds. According to some embodiments the heat radiation is performed by heating for between 250 to 300 seconds. According to some embodiments, the heat radiation is performed by heating for between 300 to 350 seconds. According to some embodiments, the heat radiation is performed by heating for between 350 to 400 seconds. According to some embodiments, the heat radiation is performed by heating for between 400 to 450 seconds. According to some embodiments, the heat radiation is performed by heating for between 450 to 500 seconds. According to some embodiments, the heat radiation is performed by heating for between 500 to 550 seconds. According to some embodiments, the heat radiation is performed by heating for between 550 to 600 seconds.

According to some embodiments, when the substrate is a pre-coated substrate, the radiation, causes the RI to form radicals, which, in turn, react with the substrate coating, e.g., the primer, as well as with the organic moieties on the NP surface. This causes the organic moieties to react with the substrate coating, e.g., the primer, thereby forming covalent bonds between the NP component and the pre-coated substrate, thereby forming the SH surface of the invention.

According to some embodiments, the concentration of the NP nanoparticles is about 0.1-70% w/w. According to some embodiments, the concentration of the NP nanoparticles is about 0.1-1.0% w/w. According to some embodiments, the concentration of the NP nanoparticles is about 1.0-5.0% w/w. According to some embodiments, the concentration of the NP nanoparticles is about 5.0-10% w/w. According to some embodiments, the concentration of the NP nanoparticles is about 10-20% w/w. According to some embodiments, the concentration of the NP nanoparticles is about 20-30% w/w. According to some embodiments, the concentration of the NP nanoparticles is about 30-40% w/w. According to some embodiments, the concentration of the NP nanoparticles is about 40-50% w/w. According to some embodiments, the concentration of the NP nanoparticles is about 50-60% w/w. According to some embodiments, the concentration of the NP nanoparticles is about 60-70% w/w.

According to some embodiments, the concentration of the RI is between about 1-70% w/w. According to some embodiments, the concentration of the RI is between about 1-10% w/w. According to some embodiments, the concentration of the RI is between about 10-20% w/w. According to some embodiments, the concentration of the RI is between about 20-30% w/w. According to some embodiments, the concentration of the RI is between about 30-40% w/w. According to some embodiments, the concentration of the RI is between about 40-50% w/w. According to some embodiments, the concentration of the RI is between about 50-60% w/w. According to some embodiments, the concentration of the RI is between about 60-70% w/w.

According to some embodiments, the RI includes or is a RPI, e.g., DMPA. According to some embodiments, the concentration of the DMPA is about 10%. According to some embodiments, the concentration of the DMPA is between about 8-12%. According to some embodiments, the concentration of the DMPA is between about 6-14%.

According to some embodiments, the concentration of the RHI is between about 0.5-30%. According to some embodiments, the concentration of the RHI is between about 0.5-5%. According to some embodiments, the concentration of the RHI is between about 5-10%. According to some embodiments, the concentration of the RHI is between about 10-15%. According to some embodiments, the concentration of the RHI is between about 15-20%. According to some embodiments, the concentration of the RHI is between about 20-25%. According to some embodiments, the concentration of the RHI is between about 25-30%.

The SH surface may be used to prepare any type of required SH article, e.g., articles having reduced ice adhesion, high water repellence, self-cleaning surfaces, reduced air and water friction surfaces, and the like.

According to some embodiments, the contact angle of the SH surface is >150°. According to some embodiments, the sliding angle of the SH surface is <10°. According to some embodiments, the tape peel may be measured according to ASTM D-3002/3359 and the abrasion may be measured according to ASTM D-1044.

Reference is now made to FIG. 1, presenting a scheme of an embodiment of the invention for preparing a SH system. As shown in FIG. 1, NPs (in this example $SiO_2$ particles), an RPI (in this example DMPA), an RHI (in this example BPO) is coated onto a polymeric substrate that may be pre-coated with a primer. After photo radiation and/or heat radiation, which form radicals causing the NPs to be covalently bound to the substrate (or to the primer pre-coated onto the substrate), the process is terminated, thereby providing an NP coated polymeric substrate, which is an example of a SH of the invention.

Unless explicitly stated, the method embodiments described herein are not constrained to a particular order or sequence. Additionally, some of the described method embodiments or elements thereof can occur or be performed simultaneously, at the same point in time, or concurrently.

Various embodiments have been presented. Each of these embodiments may of course include features from other embodiments presented, and embodiments not specifically described may include various features described herein.

EXAMPLES

Example 1

Materials

Five thermosetting matrices were studied as primers including Epoxy (Araldite 2020 by Huntsman Advanced Materials Europe BVBA), Urethane Acrylate (UA) (NOA61 by Norland Products Incorporated), Silicone Acrylate (Si-Acrylate as SiliXan® M150 by the SiliXan GmbH), Silicone-RTV (Si-RTV as Sylgard® 184 by Sigma-Aldrich) and Polyurethane (PU) based paint (by Tambour Israel). 2,2-Dimethoxy-2-phenylacetophenone (DMPA by Sigma-Aldrich) was used as photo-initiator and Benzoyl peroxide (BPO as Luperox® A75 by Sigma-Aldrich) as radical initiator. Hydrophobic (Alkyl treated) fumed silica (CAB-O-SIL TS720, Cabot Corporation, Boston, MA), technical reagent grade acetone and isopropyl alcohol (IPA) (Sigma-Aldrich) were also used, as detailed below. A variety of substrates were included in the study, including polycarbonate (PC), glass slides, aluminum (Al alloy type 2024) and borosilicate glass microscope slides (McMaster-Carr with a width of 2.2 cm×7 cm long).

Coating Preparation

The SH coating was composed of two layers and was prepared either by a dip coating (~4.5 µm) or by a spray coating (~3.5 µm). The first layer consisted of diluted epoxy and a hardener (aliphatic amine). The coating was applied on glass substrates, followed by heating for one hour at 100° C. The second layer consisted of a dispersion of 4% wt. of $SiO_2$ NPs and 0.4% wt. of DMPA in IPA. The substrates were UV irradiated until maximum conversion. All treated samples were kept in RT for 24 hours before characterizations.

Characterization Techniques

Attenuated Total Reflectance-Infrared Spectroscopy

The samples were analyzed using Attenuated Total Reflectance-Infrared Spectroscopy (ATR-IR by Bruker Optics Alpha-P), spectra were recorded in a range of 400-4000 $cm^{-1}$ at a resolution of 2 $cm^{-1}$ with 24 scans.

Topography and Roughness Analysis

Topographical imaging and profiles analysis were conducted using the following methodologies:

High Resolution Scanning Electron Microscope

High Resolution Scanning Electron Microscope (HRSEM) analysis was used to characterize the morphology of the SH coating surface (Zeiss Ultra 55 HRSEM system). The samples were cryogenic fractured, mounted, bonded to Cu pellets using a double-sided carbon tape and gold coated prior to analysis.

Profilometer

Profilometery was used to characterize the topography and roughness profiles of the SH coating surface (Veeco Dektak 6 m stylus system). The analysis was conducted before and after a Peel test and an ice adhesion strength test, in order to monitor the roughness changes. Average profiles were based on four repeats for each tested surface (treated and neat).

Atomic Force Microscopy

Atomic Force Microscopy (AFM) (Bruker Innova) was used to characterize the topography and roughness of the SH coating surface with 2D and 3D displays. The test was conducted using tapping mode at 0.5-1 Hz scan rate. A force modulation etched silicon probe with resonance frequency of 50-100 kHz was used. The results were measured by cross-section analysis using AFM nano-scope software.

Wettability Properties

Figure 2A:
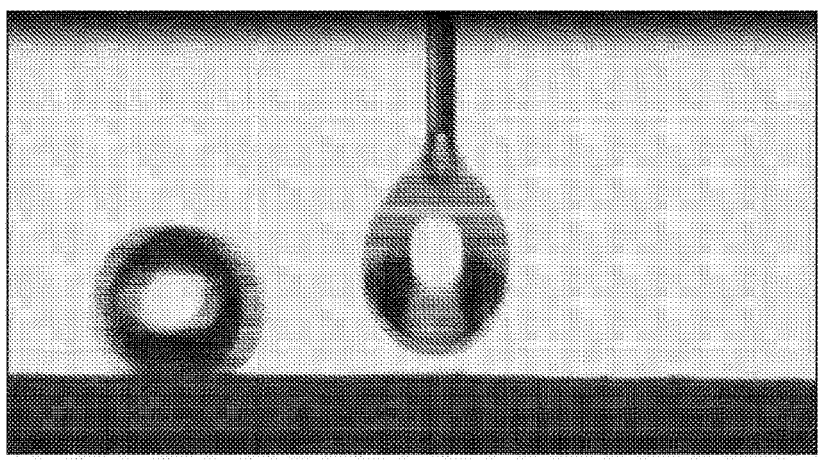
FIGS. 2a, 2B and 2C illustrate the wettability of the superhydrophobic coatings on glass substrates expressed by a CA and SA.
Figure 2B:
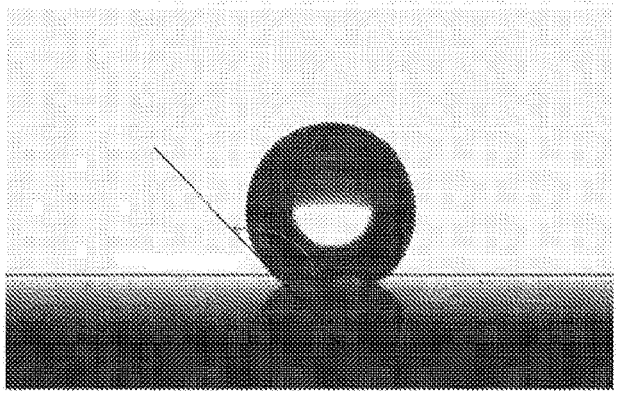
Figure 2C:

Contact angle (CA, θ) and sliding angle (SA, α) were measured (Data-physics-OCA20 system). After radiation activation and after every peel, abrasion or QUV test, the goniometer was used to characterize the coatings properties (see FIGS. 2A, 2B and 2C). CA and SA were measured using 5 μL and 30 μL deionized water droplets, respectively. Each measurement was repeated five times at five different locations on each sample plate at room temperature (RT) and relative humidity (RH) of 40%.

Light Transmittance

Transparency parameters including light transmittance and haze were measured using a Hazemeter (BYK-Gardner, Germany) according to ASTM D1003 procedure.

Durability Evaluation

Durability evaluations were conducted using the following methodologies:

Peel (Tape) Test

A peel test kit (BYK Additives and Instruments) was used to determine the adhesive strength of the material or the strength of the adhesive bond between two materials according to ASTM D-3002/3359. The test was conducted five times for each sample. Durability was characterized and evaluated by measuring the CA and SA followed to each peel step.

Taber Abrasion Test

Taber abrasion test was conducted according to ASTM D-1044. A flat specimen, approximately 100 mm square, was mounted on turntable platform that rotates on a vertical axis at a fixed speed. Two Taber abrasive wheels (CALIBRASE CS-10F) were used. The test was conducted five times for each, number of cycles on the treated polycarbonate (PC) substrates.

QUV Accelerated Weathering Test

Outdoor durability was evaluated with a UV accelerated weathering chamber (Q-LAB Company) according to ASTM D-4329, Alternating cycles of UV light and moisture at controlled temperatures were used to simulate outdoor weathering. The test represents the damage that occurs over months or years in outdoor conditions using special fluorescent UV lamps while dew and rain are simulated by condensing humidity and/or water spray. In this work, treated samples were exposed to UVA-340 fluorescent lamps with cycles comprising eight hours of radiation at 60° C. and four hours of condensation at 50° C. (ASTM D4329-Cycle A). The samples were removed from the chamber every 100 hours for evaluation, and returned to the chamber again until failure.

Results And Discussion

Durability

Figure 3A:
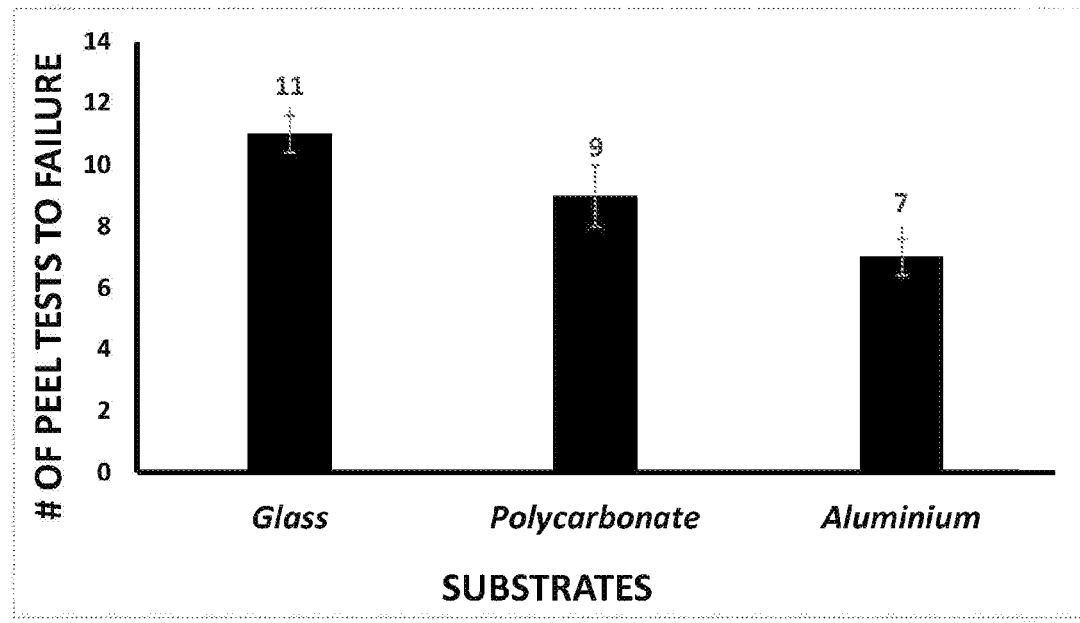
FIGS. 3A, 3B and 3C present the results of Durability by Peel ASTM D-3002/3359 tests.
Figure 3B:
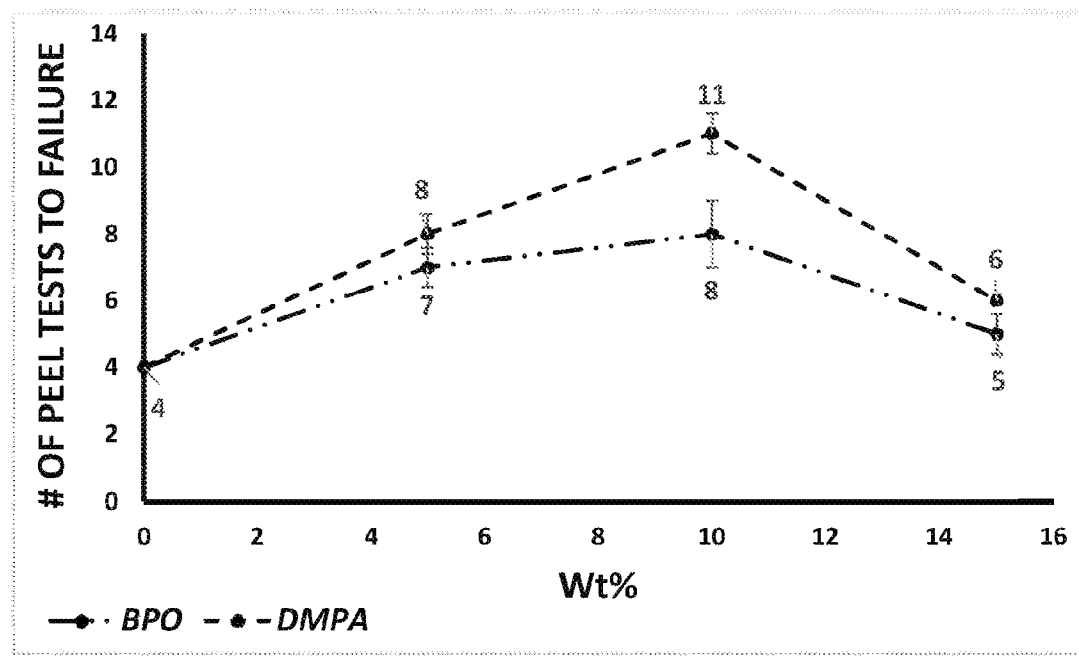

Preliminary peel tests were conducted to select the suitable SH treatment as can be seen in FIG. 3A. The Peel durability test was considered "failed" when the following conditions: contact angle (CA)<150° and sliding angle (SA) >10° were met. As shown in FIG. 3A, the best results were obtained for the glass substrate, in comparison to polycarbonate and aluminum substrates. FIG. 3B presents a comparison between the DMPA RPI or BPO peroxide. As shown therein, the best peel results were obtained using 10 wt % of DMPA. The water wettability results following the peel tests on glass substrates can be seen in Table 1, below. Four other polymeric resins (in addition to epoxy) were selected to be tested as SH coating-binders. Their durability and wettability results can be seen in FIG. 3C and Table 2, respectively.

As presented therein, epoxy and Si-RTV with 10 wt % DMPA demonstrated the best durability, while Si-Acrylate, urethane acrylate (UA) and polyurethane (PU) based paint exhibited inferior results.

TABLE 1

Wettability (average CA and SA after the samples were failed in peel, compared to the untested ones) for the SH coatings.

| Sample | Max No' of Peel tests to failure | CA (°) | SA (°) |
|---|---|---|---|
| 1-DMPA | 11 | 151 ± 0.5 | 15 ± 0.1 |
| 2-BPO | 8 | 154 ± 0.3 | 13 ± 0.4 |
| 3-epoxy (reference) | 4 | 155 ± 0.2 | 40 ± 0.3 |
| 4-Untested Samples | 0 | >160 | 0 |

TABLE 2

Wettability (average CA and SA measurements after the samples failed in peel, compared to the untested ones) for the SH coatings based on the five selected binders.

| Sample | Max No' of Peel tests to failure | CA (°) | SA (°) |
|---|---|---|---|
| 1-Epoxy | 11 | 151 ± 0.2 | 15 ± 0.1 |
| 2-Si-RTV | 8 | 154 ± 0.2 | 12 ± 0.2 |
| 3-Si-Acrylate | 3 | 155 ± 0.1 | 70 ± 0.4 |
| 4-UA | 2 | 145 ± 0.2 | 15 ± 1 |
| 5-PU Paint | 2 | 145 ± 0.3 | 45 ± 0.5 |
| 6-Untested Samples | 0 | >160 | 0 |

Figure 4:
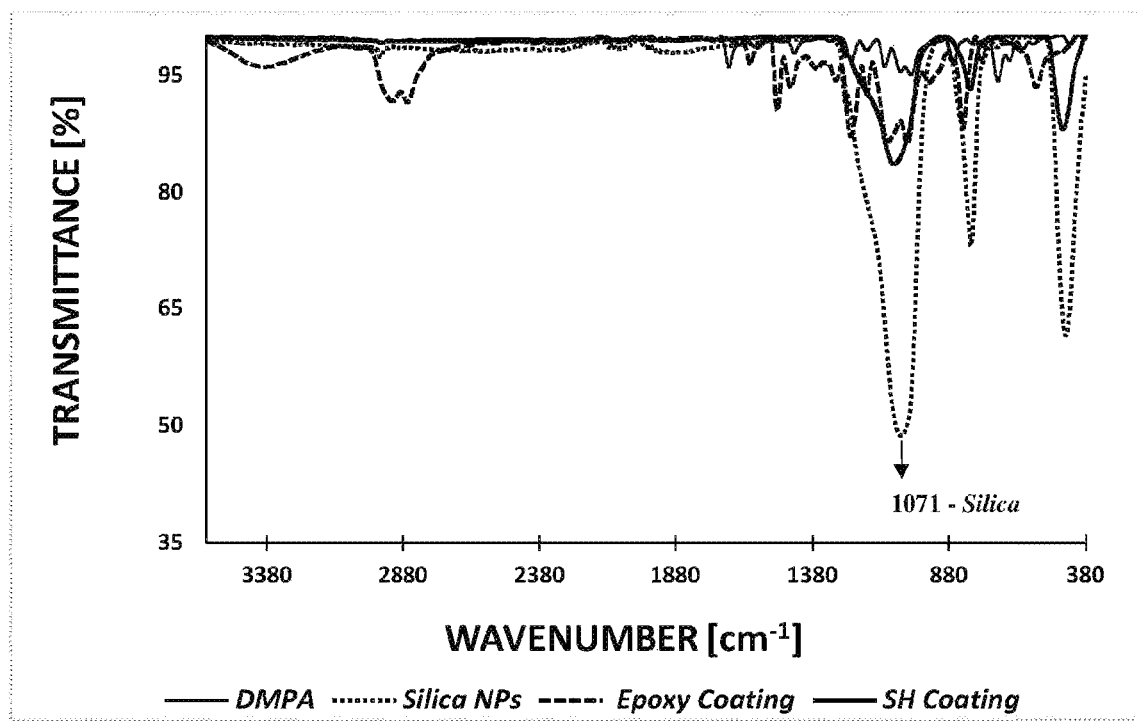
FIG. 4 presents the ATR-IR spectra of SH coating and components: DMPA photo-initiator, $SiO_2$, NPs and epoxy compared to the final applied SH coating.

ATR-IR analysis was conducted for all the five samples. ATR-IR spectrographs for Epoxy and Si-RTV binders and the $SiO_2$ NPs showed characteristic absorption bands of symmetric and asymmetric Si—O stretch, Si—$CH_3$ and alkyl C—H at 800 and 1071 and 1261 cm-1, respectively. ATR-IR results of the final coating based on Epoxy binder and its components are presented in FIG. 4.

Figure 5A:
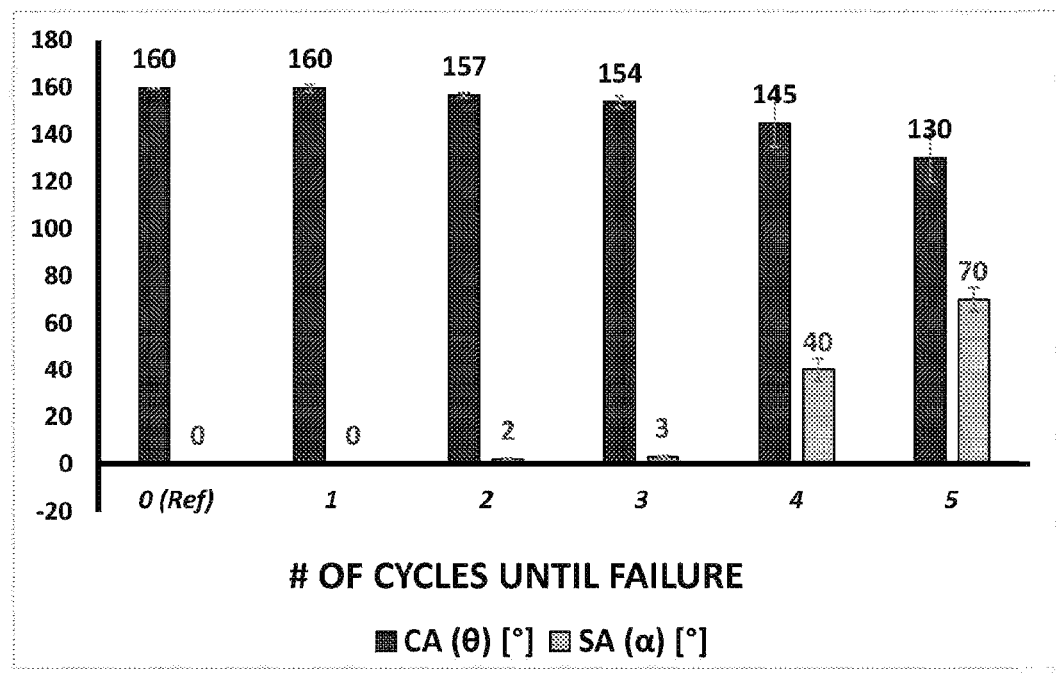
FIGS. 5A and 5B present the results of two durability tests.

Taber tests were conducted using the PC coated samples in order to measure the SH coating resistance to mechanical abrasion. Differences between the coatings could be noticed. As can be seen in FIG. 5A, the CA and SA levels of the epoxy based SH coating were reduced to 145° and 40°, respectively, after four cycles.

Figure 5B:
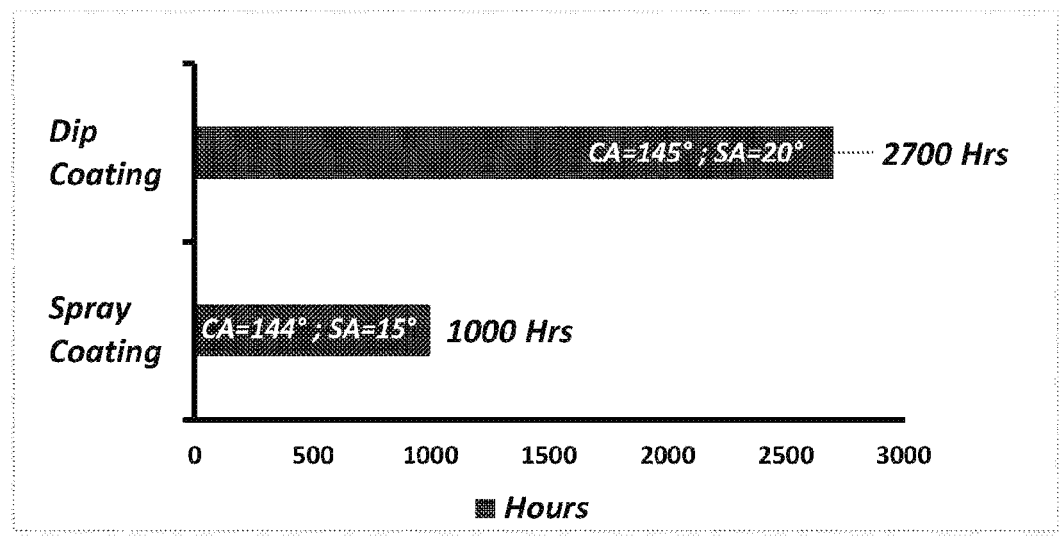

Accelerated weathering test (QUV) was used to evaluate the stability of the SH coating of treated PC samples using dip coating compared to spray coating. The results are shown in FIG. 5B. All coatings showed a slight reduction in their SH characteristics following exposure to the accelerated conditions with time. Dip coating were superior to the spray coating as it retained the SH for 2700 hrs. This may be attributed to the higher thickness obtained by dip coating compared to spray coating. It is noted that the average CA and SA values are marked in FIGS. 5A and 5B.

Transmittance

Figure 6:
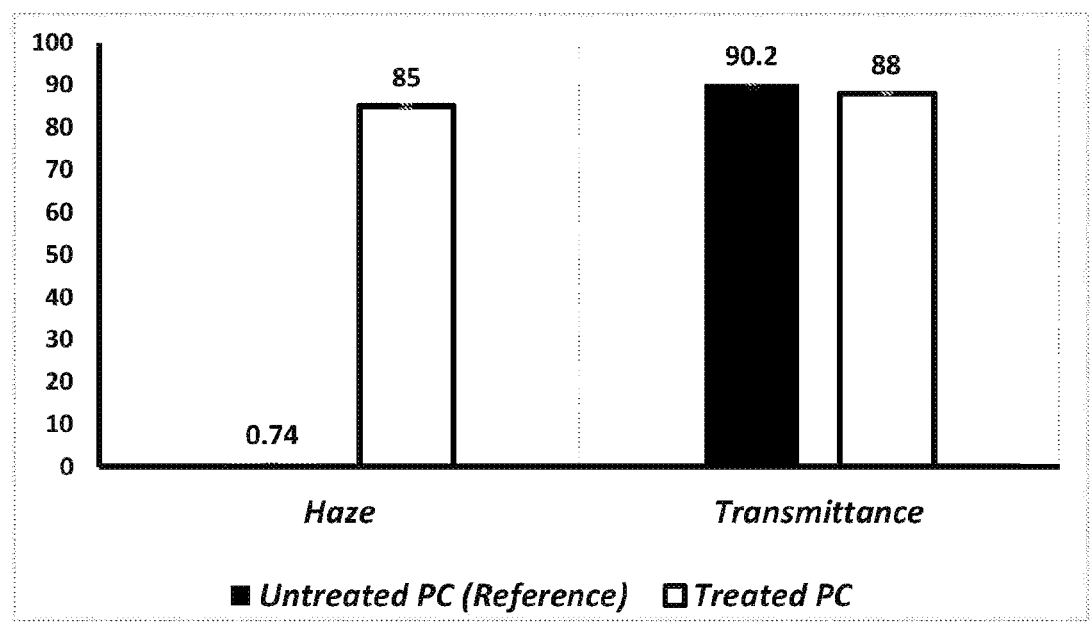
FIG. 6 presents visual and transmittance results: right-hand panel) presents light transmittance results; and left-hand panel) illustrates the visual comparison between two samples.

Light transmittance (LT) results can be seen in the right-hand panel of FIG. 6. Coated PC showed similar LT compared to untreated PC, while a high haze was measured for the coated samples. The left-hand panel of FIG. 6 illustrates the visual comparison between the two samples.

Conclusions

SH coating with improved durability was synthesized based on aliphatic treated silica NPs which are directly covalently bound by radiation activation to the coating polymer primer. The presented results indicate that the proposed approach resulted in SH surfaces having high CA>155° and low SA<5°, i.e., providing a coating with improved durability and self-cleaning effect. Spray coating demonstrated the highest light transmission. The treated substrates were characterized via goniometry (CA and SA), Haze-meter, topography and roughness characterization (AFM, HRSEM and PROFILOMETER), Peel durability test, Taber abrasion test and accelerated weathering conditions test (QUV).

Example 2

An SH surface, comprising a substrate coated by two layers was prepared by a spray coating (lengthwise and crosswise spraying four times, with two minute breaks between each spraying episode) and/or dip coating (for two minutes), as detailed below, wherein the average applied thickness of each coating was between about 3.5~4.5 µm. The substrates used were glass substrates (cleaned properly with acetone before coating application). The first layer coated onto the glass substrate was a primer layer, for providing adhesion to the substrate (five thermosetting matrices were studied as primers, as detailed below), and the second layer was the NPs containing layer, i.e., the coating composition of the invention. Radicals were obtained by heating when the coating composition comprised an RHI (BPO—benzoyl peroxide, in this example) or by photo radiation, when the coating composition comprised an RPI, as detailed below. All treated samples were kept at room temperature (RT) for 24 hours before any characterizations.
Epoxy Primer Layer:
RPI (DMPA):
The first layer consisted of epoxy (Araldite 2020 by Huntsman Advanced Materials Europe BVBA). An acetone solution of epoxy with an amine hardener (10:3 ratio) [concentration: epoxy and amine hardener—5% wt., acetone—95% wt.] was applied by spraying on the glass (microscope slides: McMaster-Carr with a width of 2.2 cm×7 cm long) substrates, followed by heating for one hour at 100° C. The second layer consisted of a dispersion of 4% wt. of $SiO_2$ NPs (CAB-O-SIL TS720, Cabot Corporation, Boston, MA) and 0.4% wt of DMPA in IPA applied by spraying. The solvent was evaporated from the surface after one minute at RT. The substrates were UV irradiated (~365 nm, three minutes) until maximum conversion (when the surface changed into milky color, as may be measured by FTIR, and a solid residue can be cleaned from the surface).
RHI (BPO):
The first layer consisted of diluted epoxy (by acetone) with an amine hardener (10:3 ratio) [concentration: epoxy and amine hardener—5% wt., acetone—95% wt.]. The coating was applied on the substrates by spraying, followed by heating for one hour at 100° C. The second layer also applied by spraying and consisted of a dispersion of 4% wt. of $SiO_2$ NPs (CAB-O-SIL TS720, Cabot Corporation, Boston, MA) in IPA and 0.4% wt. of benzoyl peroxide in acetone, the solvent was evaporated from the surface after one minute at RT, followed by heating for one hour at 80° C.
Urethane Acrylate (UA) Primer Layer:
RPI (DMPA):
The first layer consisted of UA (NOA61 by Norland Products Incorporated) and IPA (concentration: UA—6% wt., IPA—94% wt.). The coating was applied by dipping the glass (microscope slides: McMaster-Carr with a width of 2.2 cm×7 cm long) substrates into the UA-IPA solution, followed by UV irradiation (~365 nm, 5 minutes) until maximum conversion (when the surface turns from liquid into solid—becomes very stiff, and wherein the conversion can be measured by FTIR of the reactants and formation of new bonds). The second layer, which was applied by spraying, consisted of a dispersion of 4% wt. of $SiO_2$ NPs (CAB-O-SIL TS720, Cabot Corporation, Boston, MA) and 0.4% wt. of DMPA in IPA. The solvent was evaporated from the surface after one minute at RT. The substrates were UV irradiated (~365 nm, 3 minutes) until maximum conversion (when the surface changed into milky color and a solid residue can be cleaned from the surface, which can be measured by FTIR).
RHI (BPO):
The first layer consisted of UA and IPA (concentration: UA—6% wt., IPA—94% wt.). The coating was applied by dipping the substrates into the UA-IPA solution, followed by UV irradiation (~365 nm, five minutes) until maximum conversion (when the surface becomes very stiff, measured by FTIR). The second layer, which was applied by spraying, consisted of a dispersion of 4% wt. of $SiO_2$ NPs (CAB-O-SIL TS720, Cabot Corporation, Boston, MA) in IPA and 0.4% wt. of benzoyl peroxide in acetone. The solvent was evaporated from the surface after one minute at RT, followed by heating for one hour at 80° C.
Silicone Acrylate Primer Layer:
RPI (DMPA):
The first layer consisted of silicone acrylate (Si-Acrylate as SiliXan® M150 by the SiliXan GmbH) and IPA (concentration: Si-Acrylate—7% wt., IPA—93% wt.). The coating was applied by dipping the glass (microscope slides: McMaster-Carr with a width of 2.2 cm×7 cm long) substrates in the silicone acrylate—IPA solution, followed by UV irradiation (~365 nm, five minutes) until maximum conversion (When the surface becomes very stiff, measured by FTIR). The second layer, which was applied by spraying, consisted of a dispersion of 4% wt. of $SiO_2$ NPs (CAB-O-SIL TS720, Cabot Corporation, Boston, MA) and 0.4% wt. of DMPA in IPA. The solvent was evaporated from the surface after one minute at RT. The substrates were UV irradiated (~365 nm, three minutes) until maximum conversion (when the surface changed into milky color and a solid residue can be cleaned from the surface, measured by FTIR).
RHI (BPO):
The first layer consisted of silicone acrylate and IPA (concentration: Si-Acrylate—7% wt., IPA—93% wt.). The coating was applied by dipping the substrates in the silicone acrylate—IPA solution, followed by UV irradiation (~365 nm, five minutes) until maximum conversion (when the surface becomes very stiff, measured by FTIR). The second layer, which was applied by spraying, consisted of a dispersion of 4% wt. of $SiO_2$ NPs (CAB-O-SIL TS720, Cabot Corporation, Boston, MA) in IPA and 0.4% wt. of benzoyl peroxide in acetone. The solvent was evaporated from the surface after one minute at RT, followed by heating for one hour at 80° C.
Silicone-RTV (Si-RTV) Primer Layer:
RPI (DMPA):
The first layer consisted of Si-RTV (Polydimethylsiloxane elastomer, Sylgard® 184 by Sigma-Aldrich) and a curing agent (Part B composed of dimethyl, methylhydrogen siloxane, dimethyl siloxane, dimethylvinyl terminated tetramethyl tetravinyl cyclotetra siloxane) at a ratio of 10:1. An acetone solution of Si-RTV [concentration: Si-RTV+Part B—5% wt., acetone—95% wt.] was applied by spraying on the glass (microscope slides: McMaster-Carr with a width of 2.2 cm×7 cm long) substrates, followed by heating for 35 minutes at 100° C. The second layer consisted of a dispersion of 4% wt. of $SiO_2$ NPs (CAB-O-SIL TS720, Cabot Corporation, Boston, MA) and 0.4% wt. of DMPA in IPA, and was applied by spraying. The solvent was evaporated from the surface after one minute at RT. The substrates were UV irradiated (~365 nm, three minutes) until maximum conversion.

RHI (BPO):

The first layer consisted of Si-RTV and curing agent (Part B composed of dimethyl, methylhydrogen siloxane, dimethyl siloxane, dimethylvinyl terminated tetramethyl tetravinyl cyclotetra siloxane) (10:1 ratio), diluted with acetone [concentration: Si-RTV+Part B—5% wt., acetone—95% wt.]. The first layer was applied on the substrates by spraying, followed by heating for 35 minutes at 100° C. The second layer also applied by spraying and consisted of a dispersion of 4% wt. of $SiO_2$ NPs (CAB-O-SIL TS720, Cabot Corporation, Boston, MA) in IPA and 0.4% wt. of benzoyl peroxide in acetone. The solvent was evaporated from the surface after one minute at RT, followed by heating for one hour at 80° C.

Polyurethane (PU) Primer Layer:

RPI (DMPA):

The first layer consisted of a two component aliphatic PU (MIL-C-83286 by Tambour Israel), which includes Part A and Part B in a ratio of 2:1 wherein the PU was diluted with the recommended Tambour number 11 thinner (Tambour) for 10-15% vol. dilution. The coating was applied by spraying on the glass (microscope slides: McMaster-Carr with a width of 2.2 cm×7 cm long) substrates, followed by curing at RT for 12 hours. The second layer consisted of a dispersion of 4% wt. of $SiO_2$ NPs (CAB-O-SIL TS720, Cabot Corporation, Boston, MA) and 0.4% wt. of DMPA (the PI) in IPA and was applied by spraying. The solvent was evaporated from the surface after one minute at RT. The substrates were UV irradiated (~365 nm, three minutes) until maximum conversion (when the surface changed from liquid into solid, as may be measured by FTIR).

RHI (BPO):

The first layer consisted of the Tambour PU (2:1 ratio between Parts A and B of the PU primer, same composition as above), which was diluted with the recommended Tambour number 11 thinner for 10-15% vol. dilution. The coating was applied onto the glass substrates by spraying, followed by curing at RT for 12 hours. The second layer also applied by spraying and consisted of a dispersion of 4% wt. of $SiO_2$ NPs (CAB-O-SIL TS720, Cabot Corporation, Boston, MA) in IPA and 0.4% wt. of benzoyl peroxide in acetone. The solvent was evaporated from the surface after one minute at RT, followed by heating for one hour at 80° C.

Figure 3C:
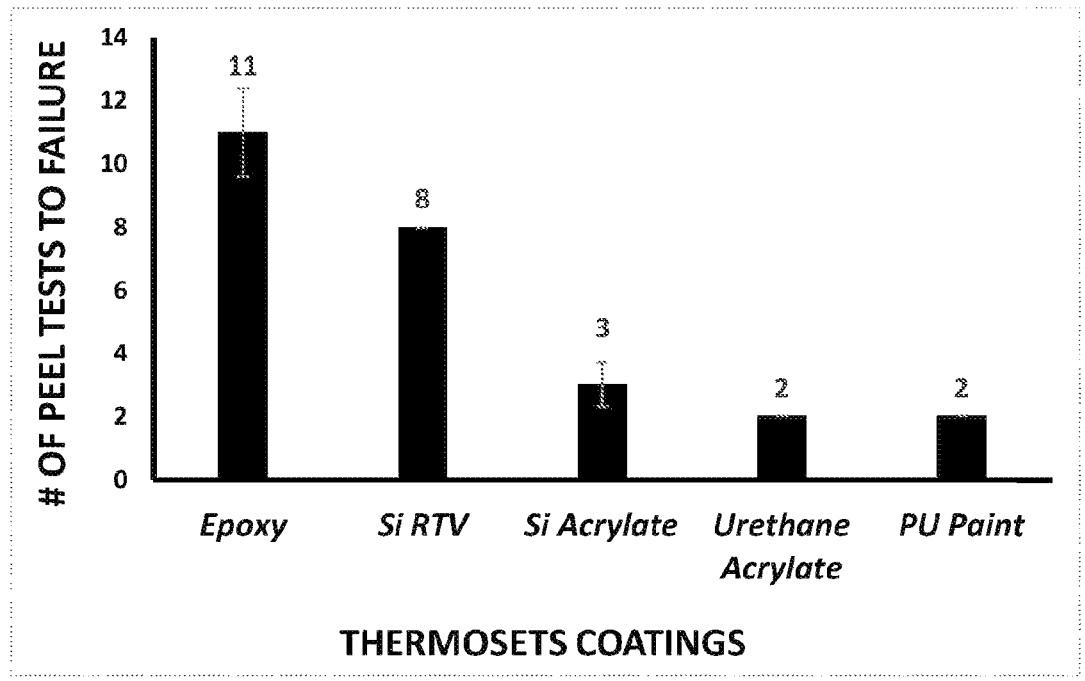

As shown in FIG. 3C, the PU layer coated by the SH second layer provides SH characteristics to the final product for two peel tests.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A coating composition consisting of a nanoparticle (NP) component, and at least one radical initiator (RI), wherein the NP component consists of NP having organic moieties bound to the surface of the NP.

2. The coating composition according to claim 1, wherein the RI is a radical photo initiator (RPI), a radical heat initiator (RHI) or any combination thereof.

3. The coating composition according to claim 2, wherein the RHI is a peroxide.

4. The composition of claim 1 which is applied to a substrate and radiation radiated.

5. The composition of claim 4 which is superhydrophobic.

6. The composition of claim 1 which is applied to a substrate and heated to 40° C.-200° C.

7. The composition of claim 6 which is superhydrophobic.

* * * * *